United States Patent [19]

Boddenberg et al.

[11] 4,267,216

[45] May 12, 1981

[54] METHOD FOR PROTECTING POWER CONNECTED MACHINE PART PAIRS FROM FRICTION CORROSION

[75] Inventors: Klaus Boddenberg; Jürgen Waldmann; Manfred Demmer, all of Duisberg, Fed. Rep. of Germany

[73] Assignee: Mannesmann Demag AG, Duisburg, Fed. Rep. of Germany

[21] Appl. No.: 65,375

[22] Filed: Aug. 9, 1979

[30] Foreign Application Priority Data

Aug. 19, 1978 [DE] Fed. Rep. of Germany ....... 2836334

[51] Int. Cl.³ .................... B32B 15/20; C23F 15/00; F16B 1/06
[52] U.S. Cl. .................... 427/397.8; 277/96.2; 403/179; 427/438; 428/450; 428/591; 428/675
[58] Field of Search .................... 415/170 R; 277/96.2, 277/166, 216, 224, 8; 428/591, 671, 675, 588, 589, 590; 308/241, 239, 237 R, 3 R, 2 R, 2 A; 403/179, 286, 287, 288

[56] References Cited

U.S. PATENT DOCUMENTS

| 2,533,840 | 12/1950 | Roehner et al. | 252/19 |
| 2,787,503 | 4/1957 | Palsulich et al. | 308/241 |
| 3,143,383 | 8/1964 | Bamberger et al. | 403/179 |
| 3,976,342 | 8/1976 | Leyendecker | 308/239 |
| 4,117,201 | 9/1978 | Keifert | 428/591 |

OTHER PUBLICATIONS

Godfrey et al., Chem. Abs. 45: 1941f, (1951).

Primary Examiner—Ralph S. Kendall
Attorney, Agent, or Firm—Mandeville and Schweitzer

[57] ABSTRACT

A method is provided for inhibiting the development of friction fatigue stress between the mating surfaces of paired machine parts, and particularly those subject to oscillatory loads. This is achieved by maintaining the mating surfaces separated by placing between them a material either of a different crystal structure than the parts separated, or a material of a greater hardness. The separating material may be in the form of a connecting element, or it may be coated onto one of the mating surfaces.

8 Claims, 1 Drawing Figure

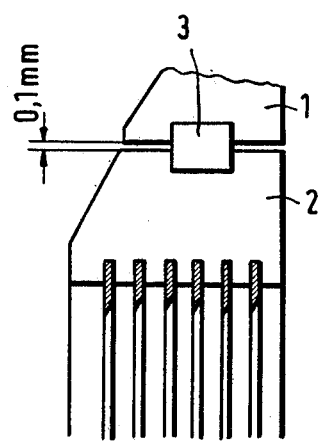

METHOD FOR PROTECTING POWER CONNECTED MACHINE PART PAIRS FROM FRICTION CORROSION

BACKGROUND AND STATEMENT OF THE INVENTION

The invention refers to a method for protecting metal machine parts which are joined together to transmit power between them and are subject to oscillatory or vibratory loads, particularly when the machine parts are of equal quality. This is achieved by avoiding direct contact between the joined surfaces by applying between the mating surfaces, at least to one surface, a coating with a substance of a different kind than that of the nature of the machine parts, or by placing connecting elements between the mated surfaces.

With metal machine parts in power-connected pairs, such as the packing seals between the rotor and the stator of a turbocompressor, there are occasionally fatigue fractures occurring far below the metal fatigue limit, originating from surface areas with damages caused by friction corrosion. The cause of this is a complete surface stress called "friction fatigue stress". This friction fatigue stress is made up of a surface compression, and alternating shearing stress, due to minute abrasive movements or slippage between the mated surfaces. The shearing stress occurring here is unexpectedly great.

The friction fatigue corrosion can damage the machine parts in two ways. On the one hand, "friction corrosion" may start as surface damage. On the other hand, the fatigue strength is lowered in machine parts under oscillatory load. Certain conclusions may be drawn from the friction corrosion damage regarding the friction fatigue stress. Should the fatigue stress exceed the tensile strength of the material, micro-cracks in the surface will result. Tribochemically activated particles may emerge from the surface, which then react spontaneously with the oxygen in the ambient air, or oxygen used as working medium, such as in oxygen compressors. The resulting oxidic abrasive products led to the definition of friction corrosion.

The extent of the surface destruction can be stated as follows: —interfacial wear increases with the number of friction vibrations, —interfacial wear increases with increasing surface compression, —the initial state of the interface has no practical effect on the extent of the destruction, —lubricants have only little influence on the reduction of friction corrosion damage.

If a machine part under oscillatory load is, in addition, subjected to friction fatigue stress on the surface, the fatigue strength is diminished. The crack in a machine part under oscillatory load, starting from such a surface under friction fatigue stress, is called in practical use "friction fatigue crack". The friction fatigue crack can safely be differentiated from other fatigue cracks by oxidic abrasive products and by a "nose" at the starting point of the crack. "Friction fatigue strength" stands for the greatest swinging stress in the structural part where friction fatigue cracks do not yet occur. The risk of friction fatigue cracks in machine parts or structural groups under oscillatory load is always present if they are shaped so that under load swinging relative displacements or slippage of the mated surfaces become possible. Thus, friction fatigue cracks occur, among others, very often in sealing inserts or packing seals for rotors of turbocompressors.

To avoid these cracks, several measures have already been recommended in *Research Issues-Forschungskuratorium* Maschinenbau e.V., issue 56, 1976: "Friction Corrosion—Final Report"; wherein it is stated that elimination of power-connected, mated joining surfaces, such as by welded, soldered, or adhesive joints instead of shrinkage and expansion joint, and (2)—reduction of the friction fatigue stress by several measures, such as by lowest possible expansion differences of the joined parts or by separation of the friction fatigue stress and the structural part stress by providing relief balancing notches or grooves at the connecting elements connecting the joined parts such as, for example, axial and tangential relief notches in adapter screws for flange clutches.

Numerous tests were also carried out with material pairings with great surface tensile strength (which is achieved, for example, by surface hardening, surface reinforcement or solidification). In different machine parts consisting of several joined components, such as in sealing inserts between the rotor and the stator of a turbocompressor, consisting essentially of bronze, it is not possible to join these parts in undetachable fashion. Also, adapters with relief notches cannot sensibly be utilized here, particularly due to great reduction of the fatigue strength. Also, other known measures for protection against friction corrosion have no sensible application.

It is the object of the invention to provide a method of the type mentioned initially, essentially prolonging the life of power-connected paired machine parts, particularly those composed of several parts which cannot be joined undetachably, and reducing the friction corrosion on these parts. The invention accomplishes this by the method of protecting metal power-connected, paired machine parts subject to oscillatory load, particularly machine parts of the same kind, from friction corrosion, whereby a direct contact between the joining surfaces is avoided by applying between the mated surfaces and at least to one surface a coating with a substance of a different kind than that of the machine parts, or by placing connecting elements between the mated surfaces, distinguished in that a connecting element is used which has a different crystal structure and/or greater hardness than the parts to be joined. In addition, the invention accomplishes this by method of protecting metal power-connected, paired machine parts subject to oscillatory load, particularly machine parts of the same kind, from friction corrosion, whereby a direct contact between the joining surfaces is avoided by applying between the mated surfaces at least to one surface a coating with a substance of a different kind than that of the machine parts, or by placing connecting elements between the mated surfaces, distinguished in that a coating of water glass is used for bronze machine parts to be joined. A favorable further development of the invention is the method of claim 1 wherein the connecting element consists of an adapter spring made of CrNi steel.

The tests which have been conducted show that besides other influences, such as slippage, surface compression, surface and heat treatment, ambient atmosphere and friction speed, the influence of the crystal structure is of considerable importance. The more uniform the crystal structure of the friction partners, the greater the tendency to mutual welding together and to friction oxidation. Another significant role of the invention is ascribed to the hardness of the material of which the friction partners are made. Furthermore, it has been shown that by applying a layer of water glass on the facing of paired rotor seals, made of bronze, for oxygen turbocompressors, friction corrosion was considerably lowered. The same effect is achieved by connecting the sealing inserts made of bronze consisting of two half-rings each with an adapter spring of CrNi steel.

An example of a connection proposed by the invention is shown in the drawing.

DESCRIPTION OF THE DRAWING

The drawing FIGURE is a partial sectional view of a connection between the parts of a sealing set for compressors illustrating the invention.

DETAILED DESCRIPTION OF THE INVENTION 1 and 2 are the half-rings of a sealing set for oxygen compressors. The parts consist of copper-nickel-bronze. A gap of 0.1 to 0.15 mm is provided between the metal surfaces. Parts 1 and 2 are connected by means of adapter spring 3 consisting of chromium-nickel-steel.

We claim:

1. A method for protecting connected-together, paired bronze machine parts, which operate in the presence of oxygen and are subject to oscillatory load, from friction corrosion, comprising the steps of
   (a) maintaining a separation distance between the mating surfaces of said machine parts of at least about 0.05 mm.; and
   (b) carrying out said maintaining step by placing a single separating material between said machine parts, said separating material having a hard consistency and being selected from materials having a greater relative hardness than said machine parts.
2. The method of claim 1, further characterized by
   (a) said maintaining step being carried out by applying as a coating said separating material to a single mating surface of one of said machine parts.
3. The method of claim 2, further characterized by
   (a) said separating material is chemically separated nickel; and
   (b) the thickness of said separating material is within the range of between about 5 and 50 microns.
4. The method of claim 3, further characterized by
   (a) said thickness is 20 microns.
5. The method of claim 2, further characterized by
   (a) said separating material is water glass.
6. The method of claim 1, further characterized by
   (a) said maintaining step being carried out by placing a connecting element between the mating surfaces of said machine parts.
7. The method of claim 6, further characterized by
   (a) said separating material of said connecting element is chromium-nickel steel.
8. The method of claim 7, wherein said separating material is an adapter spring.

* * * * *